Feb. 15, 1966  C. W. HART  3,235,022
STABILIZING ATTACHMENT FOR SWING-AXLE AUTOMOBILES
HAVING TORSION BAR SUSPENSION
Original Filed Feb. 1, 1962  2 Sheets-Sheet 2

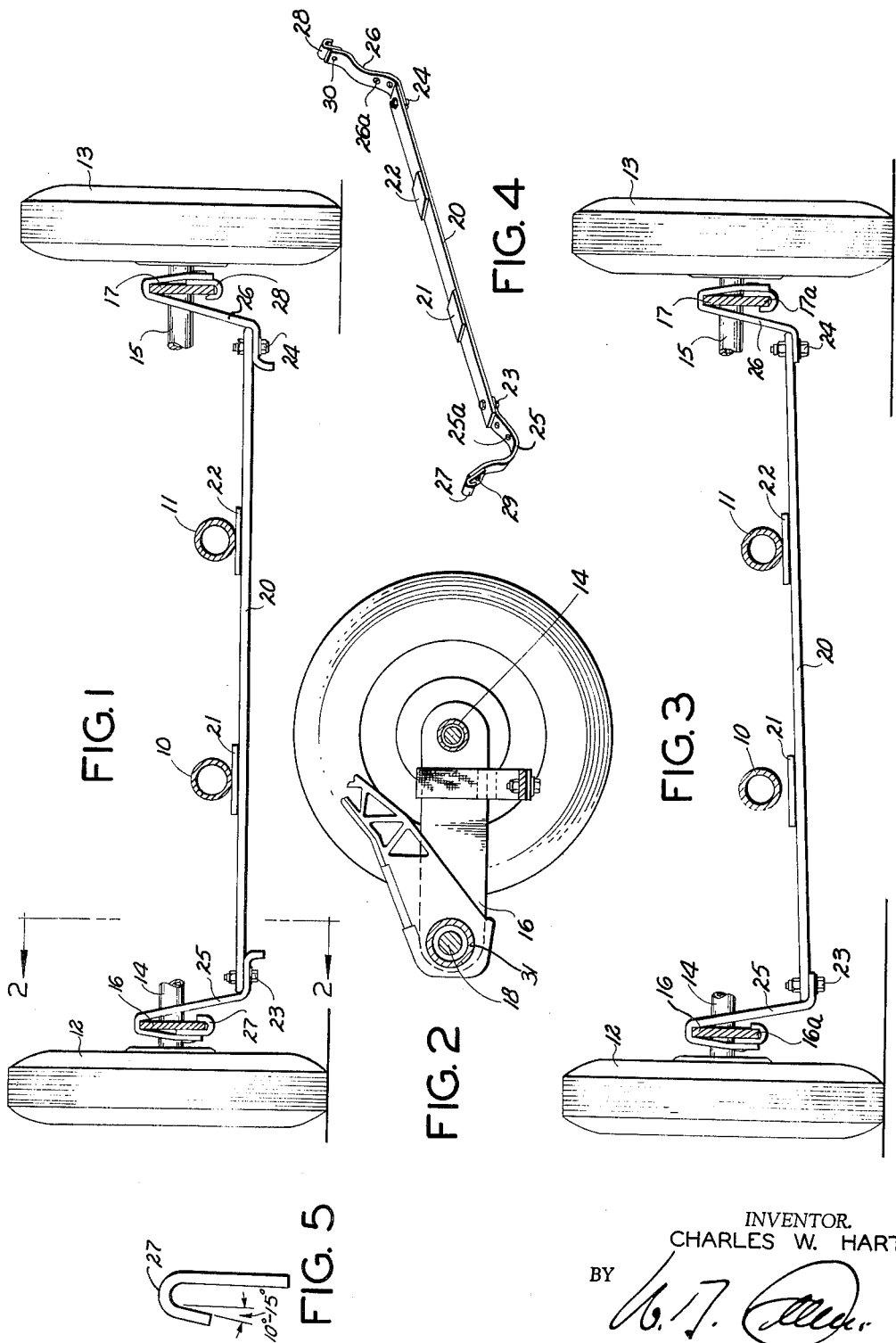

INVENTOR.
CHARLES W. HART
BY
ATTORNEY

United States Patent Office 3,235,022
Patented Feb. 15, 1966

3,235,022
STABILIZING ATTACHMENT FOR SWING-AXLE AUTOMOBILES HAVING TORSION BAR SUSPENSION
Charles W. Hart, P.O. Box 735, Grass Valley, Calif.
Continuation of application Ser. No. 170,373, Feb. 1, 1962. This application Mar. 22, 1965, Ser. No. 444,922
22 Claims. (Cl. 180—73)

This application is a continuation of my application for United States Letters Patent, Serial No. 170,373, filed February 1, 1962, and now abandoned, entitled Stabilizing Attachment for Swing Axle Automobiles Having Torsion Bar Suspension.

The present invention relates to a stabilizing attachment for automobiles, which is particularly adapted for use in conjunction with the rear end of an automobile having independently pivotal rear axles.

A prime object of the invention is the provision of means for stabilizing a motor vehicle against forces tending to roll the same sidewise by utilizing roll forces to energize stabilizer means operating to counteract the roll forces.

A prime object of the invention is to provide a stabilizing device which achieves a direct cooperative relationship between the frame, and the hinged support arms, of a swing-axle automobile.

Another object of the invention is to provide a device of the above type which is adjustable in respect to the degree or amount of stabilizing action it achieves.

A further object of the invention is to provide a device of the above type which is adjustable so as to achieve a greater stabilizing effect on one side of the vehicle than on the other.

The objects and advantages of the invention will be more fully understood from the following description considered in conjunction with the accompanying drawing, in which:

FIGURE 1 is a schematic transverse view illustrating the rear wheels, and portions of the axle housings, frame and torsion-bar support arms, of an automobile to which the invention is attached in normal operating position;

FIGURE 2 is a section view taken on the line 2—2 of FIGURE 1;

FIGURE 3 is a view like FIGURE 1, but with the invention adjusted to an alternate position to compensate for an unbalanced load on one side of the vehicle;

FIGURE 4 is a perspective view of the invention when detached from the automobile;

FIGURE 5 is an enlarged detail view of a hook utilized in the invention;

The present invention has found its initial application to a Volkswagen automobile of the type having swingable rear axles and torsion-bar suspension. The characteristics of this particular vehicle may be more fully understood by reference to "Making the Volkswagen Go," page 179, by Henry Elfrink, published by Post Motor Books, Arcadia, California, 1960; and also by reference to "Volkswagen Technical Manual," page 114, published by Henry Elfrink Automotive, Post Office Box 20715, Los Angeles 6, California, 1961.

Figure 6:
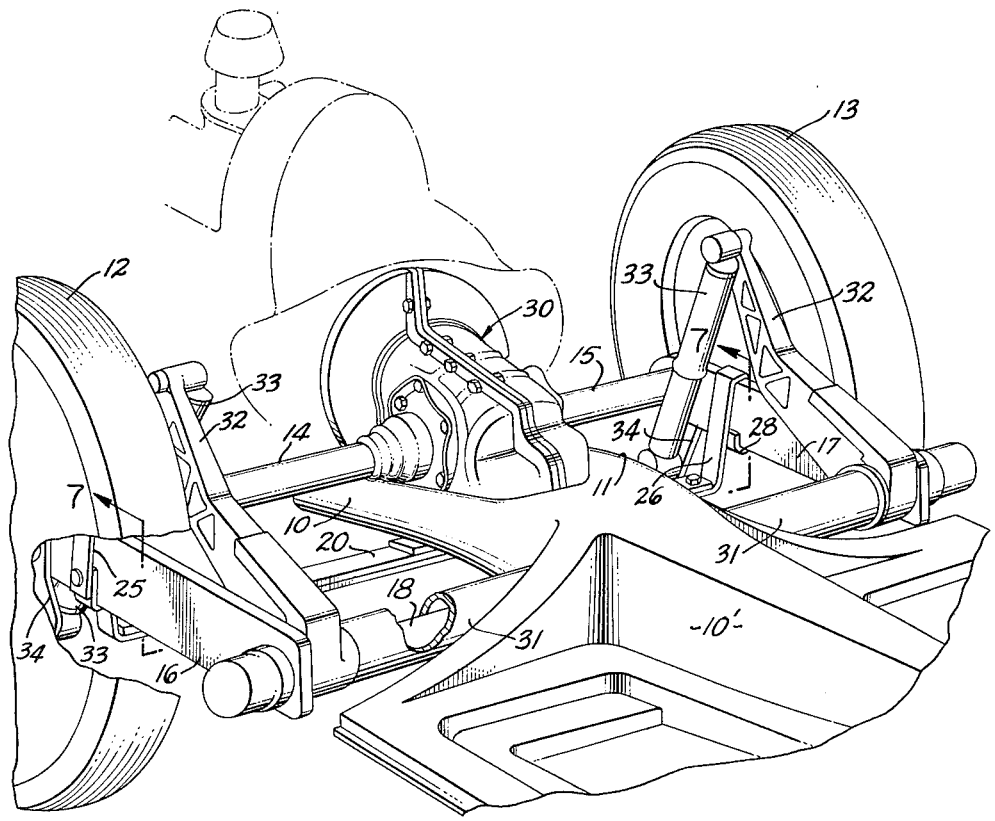
FIGURE 6 is a fragmentary general perspective view of the rear wheels and the associated frame and suspension assembly showing the invention stabilizer attached thereto.
Figure 7:
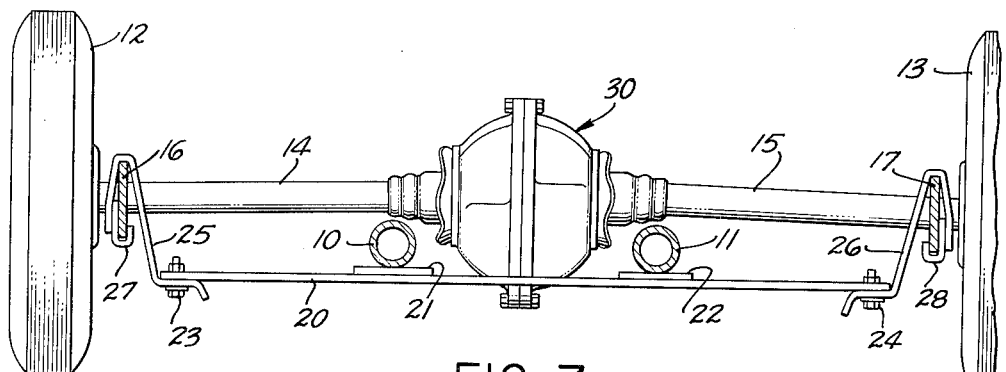
FIGURE 7 is a cross-sectional view taken along line 7—7 on FIGURE 6.

Referring now to the drawing, numerals 10 and 11 identify the horizontally separated and longitudinally extending members of what is commonly referred to as a wishbone type automotive frame. The rear wheels are identified as 12 and 13 while the portions of the rear axle housings immediately associated with the rear wheels are identified as 14, 15, respectively. Longitudinally extending support arms 16, 17 interconnect the rear axle housings with respective forwardly disposed transverse torsion-bars 18, 19. That is, the support arm 16, for example, has its forward end rigidly attached to a torsion-bar 18 that is transversely carried by the vehicle frame 10', and its rearward end rigidly attached to the outer end portion of the corresponding rear axle housing or assembly 14. The inner end portions of the rear axle assembly best shown in FIGURES 6 and 7 are pivotally supported from the transmission 30 of the vehicle, the transmission in turn being supported from the frame 10' of the vehicle by flexible couplings, all of which is not shown but is entirely conventional.

It is pointed out that in accordance with long standing commercial practice, torsion bars 18, 19 have their inner ends anchored to main frame 10' closely adjacent the longitudinal center of the vehicle and their outer ends respectively anchored in the forward ends of arms 16, 17. Enclosing the torsion bars and fixed to the opposite sides of main frame 10' are rigid tubular housings 31 terminating near the inner faces of arms 16, 17 and secured immovably to brackets 32, 32. These brackets extend upwardly and rearwardly as best appears in FIGURE 6 and are pivotally connected to the upper ends of shock absorbers 33, 33 positioned in a generally upright position beside the axle housings. The lower ends of these shock absorbers are connected to brackets 34, 34 which are fixed to and extend downwardly from the outer ends of axle housings 14, 15.

The present invention is a spring-bar assembly whose major component is an elongated flat spring-bar 20 whose length is almost sufficient to reach between the suport arms 16, 17. Spring-bar 20 is adapted to extend transversely of the vehicle underneath the vehicle frame, and has resilient pads 21, 22 attached in separated locations to its upper surface so as to supportingly engage the undersurfaces of the frame members 10, 11, respectively. Bolts 23, 24 are carried in suitable holes at the respective ends of the spring-bar, and provide the means for attaching resilient straps 25, 26 thereto.

The resilient straps at their outer ends are fastened to respective metal hooks 27, 28, the fastenings at these locations being entirely permanent and being achieved by corresponding rivets 29, 30. At their inner ends the straps have a series of longitudinally spaced openings such as 25a, 26a, which in conjunction with the bolts 23, 24 permit the adjustment of the effective strap length.

As best seen in FIGURE 1, the manner of attachment of the invention is to pass the straps 25, 26 over the upper edges of the corresponding support arms 16, 17, permitting the hooks to hang downward on the other sides of the respective support arms. The curved end of each hook then extends around, and engages from underneath, the bottom edge 16a or 17a of its corresponding support arm.

As best seen in FIGURE 5, the outer end of each hook is curved around to a position lacking 10 to 15 degrees of being parallel with the shank of the hook. As a result, the corresponding support arm 17 or 18 is frictionally locked to the hook.

One major advantage of the invention is that the amount of stabilizing action that is achieved may be controlled simply by selecting the longitudinal position of the vehicle at which the invention it attached. That is, as seen in FIGURE 2 each strap and hook of the invention works in opposition to the lever arm action of the corresponding support arm. By sliding the invention forwardly of the vehicle, closer to the torsion-bar 18, 19, the stabilizing action is diminished, while by sliding the invention toward the rear of the vehicle and closer to the axle housings 14, 15, the stabilizing action is increased.

It sometimes happens that it is desired to stabilize one side of the vehicle, for example, the driver's side, more strongly than the other side of the vehicle. The method of achieving this is by means of the present invention as illustrated in FIGURE 3. The rear wheel 13 is on the driver's side of the vehicle. Strap 26 is made of short length so as to provide strong upward support by the pad 22 upon the frame member 11 at the driver's side of the vehicle. However, strap 25 is made of greater than ordinary length, so that no upward force is exerted by pad 21 upon the frame member 10. In this manner an unbalanced load, due to the driver alone occupying the vehicle, is successfully compensated for.

While the invention has been illustrated herein as used in conjunction with a Volkswagen having torsion-bar suspension, it may also be utilized with other swing-axle automobiles.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. The combination with an automobile having a rigid main frame member extending lengthwise thereof and including a pair of rigid extensions fixed to its rear end and spaced laterally to either side of the longitudinal center line of said automobile, a transmission assembly cradled between said rigid extensions and connected to independent vertically-pivotable axle assemblies positioned laterally of the opposite sides of said transmission assembly, said axle assemblies each including a rigid arm at its outer end extending generally longitudinally of said automobile and having one end fixed to the associated axle assembly and its other end fixed to a torsion bar anchored to said main frame; that improvement which comprises a spring bar stabilizer assembly having an elongated bar of spring metal disposed transversely beneath the main frame and free of attachment thereto, separate means flexibly connecting the end portions of said spring bar to a respective one of said rigid arms and effective to hold said spring bar fulcrumed against the underside of at least one of said rigid frame extensions at all times, each of said separate flexible connecting means comprising an elongated flexible strap member having one end connected to a corresponding end portion of said spring bar, and a rigid attachment device on the outer end of each strap adapted to be attached to a respective one of said rigid arms, and at least one of said flexible strap members being adjustable in length to permit said spring bar to be adjusted to engage one or both of said extensons of said rigid frame when counteracting forces disruptive of stability of the automobile are impressed thereon.

2. In a motor vehicle of the type having a main frame extending lengthwise thereof with a pair of rigid arms fixed to its rear end and disposed laterally one closely spaced to either side of the vehicle center line, independently suspended wheel means disposed outwardly of said rigid arms and anchored to said main frame and including separate suspension assemblies, that improvement which comprises long spring stabilizer bar means extending transversely of and beneath and free of attachment to said pair of rigid arms, said stabilizer bar means having flexible straps adjustably connected to the opposite ends thereof and having means at the free ends of said straps for securing the free end portions to a part of the adjacent one of said wheel suspension assemblies with the intermediate portions of said straps free to flex to and fro transversely of the vehicle, said stabilizer bar means being effective to stabilize said vehicle through a long spring lever arm extending between one of said straps and fulcruming contact with the overlying one of said pair of arms remote from said one strap, either end of said stabilizer bar means being adapted to provide stabilizer action for each of said wheel suspension assemblies from a fulcrum point against the underside of that one of said pair of rigid frame arms remote from the suspension assembly in need of stabilizing action and whereby the spring stabilizing action provided acts through a portion of said spring bar greater than one half the length thereof.

3. The combination with an automobile having a rigid main frame member extending lengthwise thereof and including a pair of rigid extensions fixed to its rear end and spaced laterally to either side of the longitudinal center line of said automobile, a transmission assembly cradled against said rigid extensions and connected to independent vertically-pivotable axle assemblies positioned laterally of the opposite sides of said transmission assembly, said axle assemblies each including a rigid arm at its outer end extending generally longitudinally of said automobile and having one end fixed to the associated axle assembly and its other end fixed to a torsion bar anchored to said main frame, that improvement which comprises a spring bar stabilizer assembly having an elongated bar of spring metal disposed transversely beneath said main frame and free of attachment thereto, separate means flexibly connecting the end portions of said spring bar to a respective one of said rigid arms and effective to hold said spring bar fulcrumed against the underside of at least one of said rigid frame extensions at all times, each of said flexible separate connection means including a rigid attachment device adapted for attachment to a respective one of said rigid arms, and an elongated flexible member interconnecting said attachment device with a corresponding end portion of said spring bar, each of said attachment devices comprising a metal hook carried by each of said elongated flexible members and of sufficient length to extend over the associated one of said rigid arms when the associated metal hook extends down the outer side thereof and is hooked about the underneath edge thereof, said hooks being positionable at a selected longitudinal portion of said rigid arms to provide a corresponding degree of stabilizing action by said spring bar assembly.

4. The combination with an automobile having a rigid main frame member extending lengthwise thereof and including a pair of rigid extensions fixed to its rear end and spaced laterally to either side of the longitudinal center line of said automobile, a transmission assembly cradled against said rigid extensions and connected to independent vertically-pivotable axle assemblies positioned laterally of the opposite sides of said transmission assembly, said axle assemblies each including a rigid arm at its outer end extending generally longitudinally of said automobile and having one end fixed to the associated axle assembly and its other end fixed to a torsion bar anchored to said main frame; that improvement which comprises a spring-bar stabilizer assembly having an elongated bar of spring metal disposed transversely beneath said main frame and free of attachment thereto, separate means flexibly connecting the end portions of said spring bar to a respective one of said rigid arms and effective to hold said spring bar fulcrumed against the underside of at least one of said rigid frame extensions at all times, each of said flexible separate connection means including a rigid attachment device adapted for attachment to a respective one of said rigid arms, and an elongated flexible member interconnecting said attachment device with a corresponding end portion of said spring bar, each of said elongated flexible members being of sufficient length to extend over the associated rigid arm and including an associated metal hook extending along the outer side thereof and embracing the lower edge of said rigid arm.

5. A stabilizer bar assembly adapted to be attached crosswise of the underside of a vehicle and to have its opposite ends flexibly attached to the suspension assembly of a pair of independently suspended wheels, said stabilizer bar assembly comprising a long flat length of high strength spring steel, a pair of buffer pads secured thereto at points spaced to either side of the midlength of said bar, and a pair of high strength flexible straps projecting axially beyond the ends of said bar each having a hook at its free end adapted to embrace one edge of a portion of the adjacent suspension assembly for an associated wheel, and said stabilizer bar assembly being designed to function without means connecting its midportion to any part of a vehicle and adapted to be supported on that vehicle only from its opposite ends.

6. A stabilizer bar assembly adapted to be attached crosswise of the underside of a vehicle and to have its opposite ends flexibly attached to the suspension assembly of a pair of independently suspended wheels, said stabilizer bar assembly comprising a long flat length of high strength spring steel, a pair of high strength flexible straps having means for adjustably securing the same to the opposite ends of said stabilizer bar, the free ends of said straps having hooks fixed thereto having converging interior side walls, said straps being adapted to extend upwardly over the upper edge of a portion of the wheel suspension assembly and downwardly along the opposite side thereof with said hook snugly embracing and grasping the lower edge of said wheel suspension assembly thereby to anchor said stabilizer bar assembled to the vehicle without need for tools or any connection to the midportion of said long spring bar, and said hooks being shiftable laterally in either direction lengthwise of said wheel suspension assembly to vary the stabilizing effectiveness of said stabilizer bar assembly.

7. The combination with an automobile having a frame, independent rear axle assemblies each having its inner portion vertically pivotally associated with said frame, and a pair of longitudinally extending support arms each having its forward end rigidly attached to a torsion bar transversely carried by said frame and its rearward end rigidly attached to the outer portion of the corresponding rear axle assembly adjacent the associated rear wheel, of a spring-bar assembly comprising an elongated metal spring bar transversely disposed beneath said frame and normally exerting an upward force thereon, a pair of elongated flexible members each having its inner end attached to a corresponding end of said spring bar and each extending upwardly over the corresponding one of said support arms and downwardly on the outer side thereof, and a pair of rigid metal hooks each having its shank securely attached to the outer end of the corresponding flexible member and extending down the outer side of the corresponding support arm and each having a curved end which extends inwardly and hooks underneath said support arm, said hooks being positionable at a selected longitudinal position of said support arms for providing a corresponding degree of stabilizing action by said spring-bar assembly.

8. The combination claimed in claim 7 wherein one of said elongated flexible members is adjustable in length whereby said spring-bar assembly is adapted to compensate for an unbalanced load on one side of the vehicle.

9. A stabilizing attachment for a swing-axle automobile with torsion-bar suspension, comprising an elongated flat spring bar having a hole in each end thereof, a bolt in each of said holes, a pair of resilient pads attached to the upper surface of said spring bar in longitudinally separated locations thereon, a pair of resilient elongated straps each having a series of longitudinally spaced openings in its inner end portion, the inner end portion of each strap being fastened underneath a corresponding end of said spring bar by the associated one of said bolts occupying one of said series of openings, a pair of rigid metal hooks, each having its shank beneath the outer end of the associated strap and its curved end extending outwardly and downwardly therefrom, and a rivet rigidly fastening each of said hooks to the associated strap.

10. In a motor vehicle body and chassis of the type having a rigid main frame supported at its ends by spring suspension means and a pair of wheels, that improvement in stabilizing said vehicle against roll forces without substantial increase in or interference with the normally acting sprung weight forces acting on said spring suspension means which improvement comprises: a stabilizer assembly having elongated lever means extending transversely of one end of the vehicle frame adjacent a pair of said wheels, said stabilizer assembly being resilient and including means for connecting the opposite ends of said lever means to a non-sprung portion of the wheel end of an adjacent one of said spring suspension means in such manner as to hold said lever means normally resiliently fulcrumed upwardly in contact with overlying portions of said main frame at points spaced laterally to either side of the longitudinal center thereof and free to pivot out of contact with either side of the frame to counteract roll forces acting on said vehicle, said connection means being so adjusted as to avoid changing the normal proper camber adjustment of the vehicle wheels under static adjustment conditions and so as to produce substantially no measurable change in the vehicle height through change in the loading on the vehicle suspension system, whereby roll forces acting crosswise of said motor vehicle and tending to roll said frame sidewise are transmitted in part downwardly against said lever means by depression of one side of said frame thereby substantially increasing the loading on one end of said lever means and pivoting said lever means out of contact with the other side of said frame to counteract said roll forces and to transfer a part of the roll forces through said lever means to the wheel on the side opposite the direction of roll and to utilize the roll forces so transferred to urge that wheel against the roadway.

11. The combination with an automobile having a rigid main frame member extending lengthwise thereof and including a pair of rigid frame members spaced laterally to either side of the longitudinal center line of said automobile, a transmission assembly cradled between said rigid frame members and connected to independent vertically-pivotable axle assemblies positioned laterally of the opposite sides of said transmission assembly, said axle assemblies each including a rigid arm at its outer end extending generally longitudinally of said automobile and having one end fixed to the associated axle assembly and its other end fixed to a torsion bar anchored to said main frame; that improvement which comprises a spring bar stabilizer assembly having an elongated bar of spring metal disposed transversely beneath the main frame and free of attachment thereto, separate means flexibly connecting the end portions of said spring bar to a respective one of said rigid arms and effective to hold said spring bar fulcrumed against the underside of at least one of said rigid frame extensions at all times, each of said separate flexible connecting means comprising an elongated flexible strap member having one end connected to a corresponding end portion of said spring bar, and a rigid attachment device on the outer end of each strap adapted to be attached to a respective one of said rigid arms, and at least one of said flexible strap members being adjustable in length to permit said spring bar to be adjusted to engage one or both of said extensions of said rigid frame when counteracting forces disruptive of stability of the automobile are impressed thereon.

12. The combination with an automobile having a rigid main frame member extending lengthwise thereof and including a pair of rigid extensions fixed to one end and spaced laterally to either side of the longitudinal center line of said automobile, independent vertically-pivotable axle assemblies positioned laterally of said one end, said axle assemblies each including a rigid arm at its outer end extending generally longitudinally of said automobile and having one end fixed to the associated axle assembly and its other end fixed to a torsion bar anchored to said main frame, that improvement which comprises a spring bar stabilizer assembly having an elongated bar of spring metal disposed transversely beneath said main frame and free of attachment thereto, separate means flexibly connecting the end portions of said spring bar to a respective one of said rigid arms and effective to hold said spring bar fulcrumed against the underside of at least one of said rigid frame extensions at all times, each of said flexible separate connection means including a rigid attachment device adapted for attachment to a respective one of said rigid arms, and an elongated flexible member interconnecting said attachment device with a corresponding end portion of said spring bar, each of said attachment devices comprising a metal hook carried by each of said elongated flexible member and of sufficient length to extend over the associated one of said rigid arms when the associated metal hook extends down the outer side thereof and is hooked about the undereneath edge thereof, said hooks being positionable at a selected longitudinal portion of said rigid arms to provide a corresponding degree of stabilizing action by said spring bar assembly.

13. The combination with an automobile having a rigid main frame member extending lengthwise thereof and including a pair of rigid extensions fixed to one end and spaced laterally to either side of the longitudinal center line of said automobile, independent vertically-pivotable axle assemblies positioned laterally of the opposite sides of said one end, said axle assemblies each including a rigid arm at its outer end extending generally longitudinally of said automobile and having one end fixed to the associated axle assembly and its other end fixed to a torsion bar anchored to said main frame; that improvement which comprises a spring-bar stabilizer assembly having an elongated bar of spring metal disposed transversely beneath said main frame and free of attachment thereto, separate means flexibly connecting the end portions of said spring bar to a respective one of said rigid arms and effective to hold said spring bar fulcrumed against the underside of at least one of said rigid frame extensions at all times, each of said flexible separate connection means including a rigid attachment device adapted for attachment to a respective one of said rigid arms and including an associated metal hook extending along the outer side thereof and embracing the lower edge of said rigid arm, and an elongated flexible member interconnecting said attachment device with a corresponding end portion of said spring bar, each of said elongated flexible members being of sufficient length to extend over the associated rigid arm.

14. A stabilizer bar assembly adapted to be attached crosswise of the underside of a vehicle and to have its opposite ends flexibly attached to the suspension assembly of a pair of independently suspended wheels, said stabilizer bar assembly comprising a long flat length of high strength spring steel, a pair of buffer pads secured thereto at points spaced to either side of the midlength of said bar, and a pair of high strength flexible means attached to the ends of said bar each having a hook at its free end adapted to embrace one edge of a portion of the adjacent suspension assembly for an associated wheel, and said stabilizer bar assembly being designed to function without means connecting its midportion to any part of a vehicle and adapted to be supported on that vehicle only from its opposite ends with portions thereof positioned to either side of its midportion being adapted to fulcrum about either side of a vehicle frame to counteract roll of the vehicle about a longitudinal axis therethrough.

15. A stabilizer bar assembly adapted to be attached crosswise of the underside of a vehicle and to have its opposite ends flexibly attached to the suspension assembly of a pair of independently suspended wheels, said stabilizer bar assembly comprising a long flat length of high strength spring steel, a pair of high strength flexible means having means for adjustably securing the same to the opposite ends of said stabilizer bar, the free ends of said flexible means having hooks fixed thereto having converging interior side walls adapted to extend upwardly over the upper edge of a portion of the wheel suspension assembly and downwardly along the opposite side thereof with said hook snugly embracing and grasping the lower edge of said wheel suspension assembly thereby to anchor said stabilizer bar assembled to the vehicle without need for tools or any connection to the midportion of said long spring bar, and said hooks being shiftable laterally in either direction lengthwise of said wheel suspension assembly to vary the stabilizing effectiveness of said stabilizer bar assembly.

16. The combination with an automobile having a frame, independent axle assemblies each having its inner portion vertically pivotally associated with said frame, and a pair of longitudinally extending support arms each having its forward end rigidly attached to a torsion bar transversely carried by said frame and its free end rigidly attached to the outer portion of the associated wheel and axle assembly, of a spring-bar assembly comprising an elongated metal spring bar transversely disposed beneath said frame and normally exerting an upward force on either side thereof, a pair of elongated flexible members each having its inner end attached to a corresponding end of said spring bar and each extending upwardly over the corresponding one of said support arms and downwardly on the outer side thereof, and a pair of rigid metal hooks each having its shank securely attached to the outer end of the corresponding flexible member and extending down the outer side of the corresponding support arm and each having a curved end which extends inwardly and hooks underneath said support arm, said hooks being positionable at a selected longitudinal position of said support arms for providing a corresponding degree of stabilizing action by said spring-bar assembly.

17. In a motor vehicle of the type having steering control means and a rigid main frame supported at its ends by respective pairs of wheels each having resilient suspension means between the sprung and the unsprung weight of the vehicle, that improvement which comprises stabilizing means effective to reduce steering control required to maintain control of the vehicle, said stabilizing means including elongated resilient lever means extending transversely of the vehicle closely adjacent one pair of said wheels and including means for connecting the same to the adjacent one of said pair of wheels, said connecting means being adjusted to hold said lever means selectively fulcrumed upwardly against respective abutment means offset laterally to either side of the longitudinal center line of the vehicle and forming part of the sprung weight of the vehicle, said connecting means also being so adjusted as not to affect wheel camber and the spring rate of the resilient suspension means of the associated wheels significantly, and said stabilizing lever means being operable automatically in response to incipient forces tending to roll the vehicle to fulcrum said lever means downwardly out of contact with one of said abutment fulcrums while pressing upwardly against the other of said abutment fulcrums in a direction to counteract said incipient roll forces and to minimize the effort required to be applied by the vehicle operator to maintain steering control.

18. In a motor vehicle of the type having steering control means and a rigid main frame supported at its ends by respective pairs of wheels each having resilient suspension means between the sprung and the unsprung weight of the vehicle, that improvement which comprises stabilizing means effective to reduce steering control required to maintain control of the vehicle, said stabilizing means including elongated resilient lever means extending transversely of the vehicle between one pair of said wheels with the ends thereof connected to the adjacent wheel near the axle portion thereof, a pair of abutment means carried on the sprung weight of said vehicle and having unattached bearing contact with the upper side thereof at fulcrum points spaced laterally to either side of the longitudinal center line of the vehicle, said stabilizer lever means being normally preloaded upwardly against said abutment means by a value of negligible magnitude as respects the sprung loading on the resilient suspension means for the adjacent vehicle wheel and effective to condition said resilient stabilizer means for instant response to initial roll of the sprung weight of the vehicle and indicative of an incipient roll condition, whereby roll forces acting on said vehicle are transmitted downwardly through one of said abutment means acting as a fulcrum and to that one of said wheels most remote from said one abutment means to increase the downward load on said one wheel, and whereby roll of the wheel produced by said roll forces elevates the other of said abutment means out of bearing contact with said lever means so that the upward reaction forces from the loading on said stabilizing lever means are effective to counteract said roll forces.

19. A motor vehicle as defined in claim 18 characterized in that said stabilizer lever means is normally preloaded upwardly against said abutment means by a value insufficient to modify the static design camber of the vehicle wheels yet sufficient to condition said stabilizer for instantaneous effective response to incipient roll conditions.

20. A motor vehicle as defined in claim 19 characterized in that said stabilizer lever means is normally preloaded substantially uniformly upwardly against each of said abutment means.

21. A motor vehicle as defined in claim 18 characterized in that said stabilizer lever means is normally preloaded upwardly against one of said abutment means with a force materially greater than the preload force acting on the other of said abutments.

22. A motor vehicle as defined in claim 18 characterized in that said abutments are spaced from the nearest wheel a distance approximating one third of the distance separating said wheels.

References Cited by the Examiner
UNITED STATES PATENTS

| 2,092,612 | 9/1937 | Olley _____ 280—96.2 X |
| 2,471,135 | 5/1949 | Wyeth _____ 280—96.2 X |
| 2,695,168 | 11/1954 | Westra _____ 280—96.2 X |
| 2,741,475 | 4/1956 | Roehrig _____ 267—16 X |
| 2,961,253 | 11/1960 | Allison _____ 267—11 X |
| 2,992,835 | 7/1961 | Vittone _____ 280—124 |

FOREIGN PATENTS

| 1,161,498 | 3/1958 | France. |
| 1,173,879 | 10/1958 | France. |

BENJAMIN HERSH, *Primary Examiner.*

W. A. MARCONTELL, *Assistant Examiner.*